Sept. 19, 1967  RINNOSUKE SUSUKI ET AL  3,341,897

INJECTION MOLD

Filed May 17, 1965

United States Patent Office 3,341,897
Patented Sept. 19, 1967

3,341,897
INJECTION MOLD
Rinnosuke Susuki, Tokyo, Hiroshi Hoshi, Narashino-shi, Hiroshi Sugesawa, Tokyo, and Takeshi Kaneko, Suwa-shi, Japan, assignors to Lion Fat & Oil Co., Ltd., Edo-gawa-ku, Tokyo, Japan
Filed May 17, 1965, Ser. No. 456,406
Claims priority, application Japan, Sept. 28, 1964, 39/55,451
6 Claims. (Cl. 18—42)

ABSTRACT OF THE DISCLOSURE

An injector mold having a stationary block, a movable cavity block equipped internally with a movable core block, and a reciprocable block extending within said stationary block so as to move axially thereof, said mold being provided with through-holes inclined relative to the axis of the mold by the provision of a plurality of members with pins within said reciprocable block.

---

The present invention relates to improved injection molds used for molding, by injection, caps of bottles or the like.

When holes are to be formed in a cap at an angle with respect to the axis of the cap so that contents of the associated bottle or container can flow out to join in a single stream, the related mold has, according to conventional techniques, to be divided into several sections and core pins for forming the holes have to be drawn out separately for such section. Alternatively, the holes have to be drilled after the cap is molded. These methods are complicated and are not favorable for mass production.

A primary object of the present invention, therefore, is to provide an improved injection mold which can mold caps with a number of inclined holes in a single process.

To achieve the above and other of its objectives, the invention contemplates the provision of a block having diverging holes therein with pins slidably locatable in such holes with means being provided to move the block at a determinable rate in a determinable direction and further means being provided to displace the pins transversely of the direction of movement of the block and according to said rate to give the pins a resultant direction of movement relative to the block which is parallel to the axes of the aforesaid holes.

More particularly, there is contemplated in accordance with a preferred embodiment of the invention and as will be described in greater detail hereinafter, a mold which comprises a stationary block, a movable cavity block which is movable towards and away from the stationary block, a reciprocal block supported in the stationary block in opposed relationship with the movable block and which defines with the movable block a product cavity and a runner connected to the product cavity.

The aforesaid reciprocal block is reciprocable in a determinable direction relative to the stationary block and spring means is provided between the stationary block and reciprocal block to urge and maintain the latter against the movable block. There may also be provided a movable core block in the product cavity.

The reciprocal block is provided with a plurality of holes diverging into the product cavity for purposes of manufacturing a particular type of product and these holes define an imaginary cone having an axis parallel to the direction of movement of the reciprocal block. Further, there is provided a conical projection on the reciprocal block which has the same base angle as the aforesaid cone and is symmetrically disposed within the same. The conical projection is provided with grooves coaxially aligned with the aforesaid holes and the reciprocal block is provided with a conical hole within which the conical projection is located and which is coaxial with and has the same base angle as the cone.

Moreover, in accordance with the invention there are provided spaced segments arranged around the conical projection and cooperatively constituting a unit within the conical hole and corresponding at least in part to the shape of said conical hole. Spring means are provided which urge the segments in a direction out of the conical hole against the stationary block, the segments defining grooves opposed to the grooves in the conical projection and coaxial with the holes in the reciprocal block.

In addition, rod members are provided which are slidable in the grooves of the conical projection and segments and pins are provided on the rod members which are insertable into and withdrawable from the holes in the reciprocal block. The rod members are sandwiched between the conical projection and segments and are displaceable, along with the pins, axially and radially relative to the imaginary cone under the guidance of the segments, such that the pins are drawn axially out of the holes in the reciprocal block when the latter reciprocates away from the stationary block.

Amongst the other objects of the invention is the provision of an improved apparatus of the above-noted type and particularly one having a mold block with divergent holes therein with pins being slidable in the holes.

The improved method of operating the apparatus of the invention comprises moving the aforesaid block at a determinable rate of speed in a determinable direction and displacing the pins transversely of said direction at a rate of speed related to the aforesaid rate, such that the pins move axially in the aforesaid holes.

Further objects and advantages of the invention will appear in the following detailed description of a preferred embodiment of the invention with reference to the accompanying drawing which shows schematic longitudinal sectional views of one cavity portion of a multiple-cavity mold according to the present invention, but with cooling channels and ejector pins omitted, and in which drawing.

Figure 1:
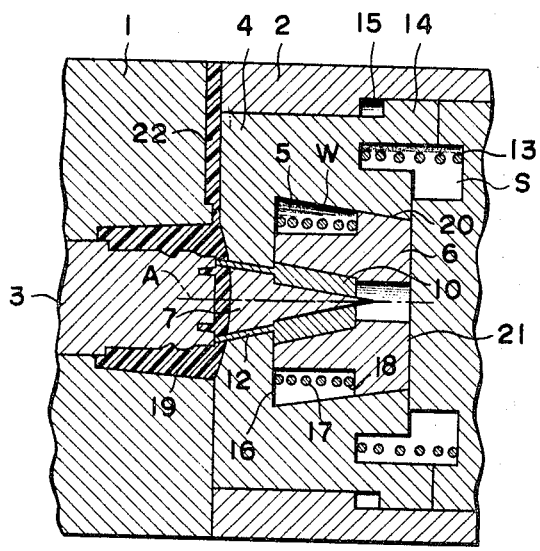
FIG. 1 shows the mold in the clamped state for injection.
Figure 3:
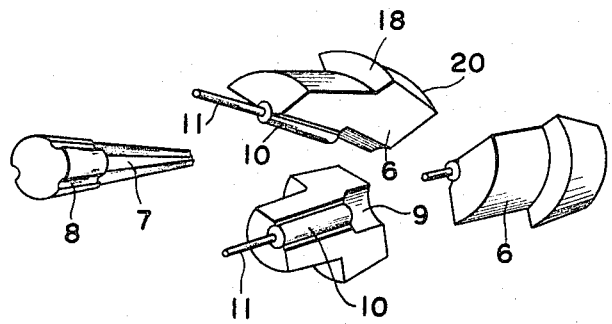
FIG. 3 shows in perspective view the parts for forming the inclined holes.

In FIG. 1, part 1 is a movable cavity block, part 2 is a stationary block, part 3 is a movable core block provided in said movable block 1, and part 4 is a reciprocating block provided in and included by said stationary block 2. In said reciprocating block 4 is formed a tapered conical hole 5 having an inclined wall W, in which three pieces of member 6 having an inclined wall 20 corresponding to that of the hole 5 are held. Part 7 is a conical or tapered projection provided in the center of the bottom 16 or said hole 5 in the reciprocating block 4, and it has three inclined grooves 8 (FIG. 3) formed in the periphery thereof.

Figure 4:
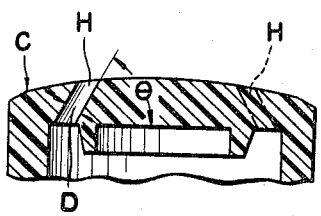
FIG. 4 is a diametral sectional and fragmentary view of a cap which can be made with the apparatus of the invention.

Between said grooves 8 and inclined grooves 9 of the members or segments 6 are held rod members 10 for forming the flowout holes H in the cap C (FIG. 4). On each of said rod members 10 is provided, integral therewith, a core pin 11 which has a diameter identical with the inner diameter D of the holes H to be formed in the cap C and which is fitted slidably into a corresponding inclined guide hole 12 in the reciprocating block 4. Holes 12 cooperatively define or lie on the surface of an imaginary cone whose axis A is parallel to the direction of reciprocation of block 4 and whose base angle corresponds to the angle θ of holes H.

Part 13 is a coil spring settled in the hollows S of the stationary block 2 and the reciprocating block 4. Portion 15 is a recessed portion in the stationary block 2 which engages a flange 14 of the block 4. This recessed portion is a little greater in length than the axial width of the flange 14 so that the block 4 can reciprocate in the stationary block 2 guided by the flange 14.

Element 17 is a coil spring between the bottom wall 16 of the hole 5 of the block 4 and shoulder portions 18 of the members 6. Features 19 and 22 are a product cavity and a runner respectively. The inclined wall W of the hole 5, the inclined walls of the members 6, the inclined groove 8 of the conical projection 7, and the inclined holes 12 of the reciprocating block 4 are all formed to have the same angle of inclination with respect to the axis of the mold. This inclination angle is also identical with the angle θ of the flow-out holes H.

An injection operation is carried out in the cavity which, as shown in FIG. 1, is defined by the movable block 1, the movable core block 3 provided in said block 1, the reciprocating block 4 of the stationary block 2, and the tips of the core pins 11 of the rod members 10 projecting from the end wall of the block 4. Then the movable block 1 is shifted leftwards to position 1' (FIG. 2) thereby moving the reciprocating block to position 4' under action of the spring 13. While said reciprocating block 4 moves, the members 6 are urged against the end wall 21 of the stationary block 2 by the spring 17 and, therefore, are moved respectively in a direction perpendicular to the axis of the mold, and toward the center of the mold due to the inclined wall W of the hole 5 in the reciprocating block 4.

Thus, the members 6 and the rod members 10 which are integral therewith move both axially and radially with respect to the reciprocating block 4 with the result that they move in the resultant direction based on these two direction vectors. Said resultant direction is identical, for example, with the inclination angle θ of the flow-out holes H of the cap C. Thus, the core pins 11 of the rod members 10 can be extracted smoothly along the flow-out holes of the molded cap.

Although the illustrated injection mold comprises a three-piece member 6 for a cap having three flow-out holes, it will be understood that the number of members 6 is not restricted to three, but can be varied according to requirements. It may also be advisable to shorten some of the core pins 11 of the rod members 10 according to the desired number of the flow-out holes to be formed in the cap without varying the number of members 6 themselves.

The variation of the inclination angle θ of the flow-out holes can be effected by changing the angle of the corresponding inclined parts of the mold. Further, the member 6 and the rod member 10 are not necessarily separated from each other as the core pin 11 may be provided immediately on the member 6, which, in this case, is to slide in the inclined groove 8 of the projection 7. In short, what is provided according to the invention is a construction and technique whereby suitable members on which core pins 11 are fixed, move in directions which are identical with those of the flow-out holes to be formed in the cap with respect to the reciprocating block 4 along the inclined wall thereof.

Thus, according to the present invention, caps with inclined flow-out holes can be easily and quickly molded.

Figure 2:
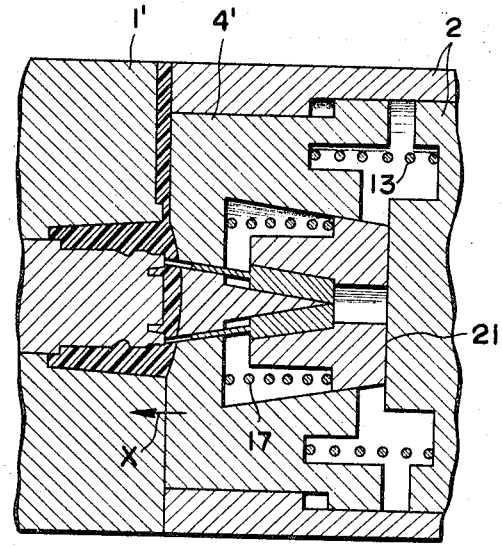
FIG. 2 shows the mold with the movable cavity block shifted leftwards and the core pins withdrawn from inclined flow-out holes.

As appears in FIG. 2, the reciprocal block 4 moves in the direction indicated by the arrow X, this being either an absolute or a relative direction of movement. The block 4, it will be appreciated, moves in such determinable direction at a determinable rate of speed, depending upon the specific requirements of the operation.

Accordingly, the method proposed for the apparatus of the invention contemplates displacing the pins 11 transversely of this direction, which is parallel to the axis A, at a rate of speed which is related to the rate of speed of movement of the block 4, such that the pins are displaced axially in the holes which are provided in divergent manner in the face of the block 4 opening into the product cavity.

There will now be obvious to those skilled in the art many modifications and variations of the structure set forth above. These modifications and variations will not depart from the scope of the invention if defined by the following claims.

What is claimed is:
1. A mold comprising a stationary block, a movable cavity block which is movable toward and away from said stationary block, a reciprocable block supported in said stationary block in opposed relationship with said movable block and which defines with the movable block a product cavity and runner connected to the product cavity, said reciprocable block being reciprocable in determinable direction relative to said stationary block, spring means between said stationary block and reciprocable block to urge and maintain the latter against said movable block, a movable core block supported in said cavity block and bounding said product cavity, said reciprocable block being provided with a plurality of holes diverging into the product cavity and defining an imaginary cone having an axis parallel to the direction of movement of said reciprocable block, a conical projection on said reciprocable block having the same base angle as said cone and being symmetrically disposed within the cone, said conical projection being provided with grooves larger than said holes but coaxially aligned therewith, said reciprocable block being further provided with a conical hole within which the conical projection is located and which is coaxial with and has the same base angle as said cone, a plurality of spaced pin means within the conical hole and corresponding at least in part to the shape of the conical hole, spring means urging the pin means in a direction out of the conical hole against said stationary block, said pin means encircling said conical projection and riding in the grooves in the conical projection and being thereby displaceable axially and radially relative to said imaginary cone such that the pin means are displaceable axially relative to the holes in the reciprocable block.

2. A mold comprising a block which defines, at least in part, a product cavity, said block being provided with a plurality of holes diverging into the product cavity, a projection on said block provided with grooves coaxially aligned with said holes, a plurality of segments spacedly arranged around said projection and defining grooves opposed to the grooves in the projection and coaxial with the holes in the block, pin members slidable in the grooves of and sandwiched between the projection and segments and insertable into and withdrawable from the holes in the block for entering and leaving the product cavity, and means for displacing the segments along with said pin members along and transversely relative to said projection such that the pin members are displaced axially relative to the holes in the block to enter and leave the product cavity.

3. A mold comprising a reciprocable block which defines, at least in part, a product cavity, said reciprocable block being reciprocable in a determinable direction and being provided with at least one hole opening into the product cavity and aligned on an imaginary cone having an axis parallel to the direction of movement of said reciprocable block, a projection on said reciprocable block being provided with a groove coaxially aligned with said hole, said reciprocable block being further provided with a tapered hole within which the projection is located and which is coaxial with and has the same base angle as said cone, a segment within and corresponding at least in part to the shape of the tapered hole, means urging the segment in a direction out of the tapered hole to a limited extent such that the segment is radially and axially displaced relative to said cone, said segment defining a groove opposed to the groove in the projection and coaxial with the hole in the reciprocable block, and pin means slidable in the grooves of and sandwiched between the projection and segment, said pin means being insertable into and withdrawable from the hole in the reciprocable block, said pin means being axially and radially displaceable relative to said imaginary cone under the guidance of said segment such that the pin means is drawn axially out of the hole in the reciprocable block.

4. A mold comprising a reciprocable block which defines, at least in part, a product cavity, said reciprocable block being reciprocable in a determinable direction and being provided with a plurality of holes diverging into the product cavity and defining an imaginary cone having an axis parallel to the direction of movement of said reciprocable block, a projection on said reciprocable block provided with grooves coaxially aligned therewith, said reciprocable block being further provided with a tapered hole within which the projection is located and which is coaxial with and has the same base angle as said cone, a plurality of segments spacedly arranged around the projection within the tapered hole and corresponding at least in part to the shape of the tapered hole, means urging the segments in a direction out of the tapered hole to a limited extent, said segments defining grooves opposed to the grooves in the conical projection and coaxial with the holes in the reciprocable block, rod members slidable in and sandwiched between the grooves of the tapered projection and segments, and pins on the rod members insertable through and withdrawable from the holes in the reciprocable block, said rod members and pins being axially and radially displaceable relative to said imaginary cone under the guidance of said segments such that the pins can be drawn axially out the holes in the reciprocable block.

5. A mold comprising a stationary block, a reciprocable block supported by said stationary block and defining, at least in part, a product cavity, said reciprocable block being reciprocable in determinable direction, spring means between said stationary block and reciprocable block to urge the latter away from said stationary block, said reciprocable block being provided with a plurality of holes diverging into the product cavity and defining an imaginary cone having an axis parallel to the direction of movement of said reciprocable block, a tapered projection on said reciprocable block having the same base angle as said cone and being symmetrically disposed within the cone, said tapered projection being provided with grooves larger than said holes but coaxially aligned therewith, said reciprocable block being further provided with a tapered hole within which the tapered projection is located and which is coaxial with and has the same base angle as said cone, a plurality of segments spacedly arranged around the tapered projection and cooperatively constituting a unit within the tapered hole and corresponding at least in part to the shape of the tapered hole, spring means urging the segments in a direction out of the tapered hole against said stationary block, said segments encircling said tapered projection and defining grooves opposed to the grooves in the tapered projection and coaxial with but larger than the holes in the reciprocable block, rod members slidable in the grooves of the tapered projection and segments, and pins on the rod members insertable through and withdrawable from the holes in the reciprocable block, said rod members being sandwiched between the tapered projection and segments and being displaceable along with said pins axially and radially relative to said imaginary cone under the guidance of said segments such that the pins are drawn axially out of the holes in the reciprocable block when the latter reciprocates away from said stationary block.

6. A mold comprising a stationary block, a movable cavity block which is movable toward and away from said stationary block; a reciprocable block supported in said stationary block in opposed relationship with said movable block and which defines with the movable block a product cavity and runner connected to the product cavity, said reciprocable block being reciprocable in determinable direction relative to said stationary block, spring means between said stationary block and reciprocable block to urge and maintain the latter against said movable block, a movable core block supported in said cavity block and bounding said product cavity, said reciprocable block being provided with a plurality of holes diverging into the product cavity, the holes defining an imaginary cone having an axis parallel to the direction of movement of said reciprocable block, a conical projection on said reciprocable block having the same base angle as said cone and being symmetrically disposed within the cone, said conical projection being provided with grooves larger than said holes but coaxially aligned therewith, said reciprocable block being further provided with a conical hole within which the conical projection is located and which is coaxial with and has the same base angle as said cone, a plurality of spaced segments arranged around the conical projection and cooperatively constituting a unit within the conical hole and corresponding at least in part to the shape of the conical hole, spring means urging the segments in a direction out of the conical hole against said stationary block, said segments defining grooves opposed to the grooves in the conical projection and coaxial with but larger than the holes in the reciprocable block, rod members slidable in the grooves of the conical projection and segments, and pins on the rod members insertable into and withdrawable from the holes in the reciprocable block, said rod members being sandwiched between the conical projection and segments and being displaceable along with said pins axially and radially relative to said imaginary cone under the guidance of said segments such that the pins are drawn axially out of the holes in the reciprocable block when the latter reciprocates away from said stationary block.

References Cited
UNITED STATES PATENTS

| | | | |
|---|---|---|---|
| 2,366,475 | 1/1945 | Bartholomew | 249—59 |
| 2,558,027 | 6/1951 | Wilson | 18—42 |
| 2,578,719 | 12/1951 | Mayer et al. | 18—42 |
| 2,783,502 | 3/1957 | Abplanalp | 249—63 |
| 2,874,414 | 2/1959 | Sargent | 18—42 |
| 3,049,759 | 8/1962 | Eberhardt | 18—2 X |
| 3,183,552 | 5/1965 | Farkas | 18—2 X |
| 3,266,098 | 5/1966 | Bucy | 18—42 |

J. SPENCER OVERHOLSER, *Primary Examiner.*

J. HOWARD FLINT, Jr., *Examiner.*